United States Patent
Hogan

(10) Patent No.: US 9,415,573 B2
(45) Date of Patent: Aug. 16, 2016

(54) LIGHT FILTERING TRANSLUCENT FILM FOR VEHICLE MIRROR

(71) Applicant: Samuel Livingston Hogan, Fairfax, VA (US)

(72) Inventor: Samuel Livingston Hogan, Fairfax, VA (US)

(73) Assignee: Samuel Livingston Hogan, Fairfax, VA (US)

( * ) Notice: Subject to any disclaimer, the term of this patent is extended or adjusted under 35 U.S.C. 154(b) by 183 days.

(21) Appl. No.: 14/120,320

(22) Filed: May 15, 2014

(65) Prior Publication Data

US 2015/0329052 A1    Nov. 19, 2015

(51) Int. Cl.

| | |
|---|---|
| *G02B 5/08* | (2006.01) |
| *B32B 33/00* | (2006.01) |
| *B60R 1/08* | (2006.01) |
| *G02B 5/22* | (2006.01) |
| *G02B 5/20* | (2006.01) |
| *B32B 37/00* | (2006.01) |
| *B32B 38/00* | (2006.01) |
| *B32B 38/10* | (2006.01) |
| *B29C 63/00* | (2006.01) |

(52) U.S. Cl.
CPC ............... *B32B 33/00* (2013.01); *B29C 63/00* (2013.01); *B32B 37/00* (2013.01); *B32B 37/025* (2013.01); *B32B 38/00* (2013.01); *B32B 38/0012* (2013.01); *B32B 38/10* (2013.01); *B60R 1/08* (2013.01); *B60R 1/083* (2013.01); *B60R 1/084* (2013.01); *G02B 5/20* (2013.01); *G02B 5/205* (2013.01); *G02B 5/22* (2013.01); *B32B 2307/414* (2013.01); *B32B 2307/416* (2013.01); *B32B 2551/08* (2013.01); *B32B 2605/006* (2013.01)

(58) Field of Classification Search
CPC .. G02B 2027/0178; G02B 5/22; G02B 5/205; G02B 5/26; B32B 37/00; B32B 33/00; B32B 37/025; B32B 38/10; B32B 38/0012; B32B 2551/08; B32B 2307/414; B60R 1/001; B60R 1/083; B60R 1/04; B60R 1/084; B60R 1/06; B60J 3/02
USPC .................................. 156/247; 359/608, 883
See application file for complete search history.

(56) References Cited

U.S. PATENT DOCUMENTS

| | | | |
|---|---|---|---|
| 1,990,222 A * | 2/1935 | Burlein | B60J 3/02 296/97.5 |
| 2,397,947 A | 4/1946 | Colbert | |
| 6,120,085 A * | 9/2000 | Wooldridge | B60J 3/02 296/97.4 |

FOREIGN PATENT DOCUMENTS

CN    202815350    3/2013

\* cited by examiner

*Primary Examiner* — Euncha Cherry

(57) ABSTRACT

Translucent film product for vehicle mirrors and method to shield drivers from discomfort glare, particularly discomfort glare from blue light emanating from headlights. The film product embodiments include single or multiple film layers; yellow or yellow and grey tinting; tabbed or un-tabbed; and glue or static cling means to adhere the film product to vehicle mirrors.

8 Claims, 2 Drawing Sheets

LIGHT FILTERING TRANSLUCENT FILM FOR VEHICLE MIRROR

FIELD OF THE INVENTION

This application relates to a light filtering translucent film for a vehicle mirror.

BACKGROUND OF THE INVENTION

An increased prevalence in the use of high intensity discharge (HID) lights as headlights has been accompanied by an increased number of driver complaints to the National Highway Traffic Safety Administration (NHTSA) about headlight glare. DOT HS 809 669 *Drivers' Perceptions of Headlight Glare from Oncoming and Following Vehicles* (January 2004). Both the higher intensity of light and the greater proportion of light in the blue spectrum from HID headlights contribute to a greater degree of discomfort glare relative to that produced by standard halogen headlights.

The use of Light-Emitting Diodes (LED) headlights is also becoming more prevalent. And as with HID headlights, LED headlights produce a greater proportion of light in the blue spectrum than standard halogen headlights, which causes greater discomfort glare. Additionally researchers have determined that human exposure to LED light, without the protection of a blue light absorbing filter, increases the risk of retinal degenerative diseases, mainly Age Related Macular Degeneration (AMD). Thus some researchers recommend eye protection to limit exposure to blue light. Chamorro E, Carralero S F, Bonnin-Arias C, Pérez-Carrasco M J, de Luna J M, et al. (2013) *Photoprotective Effects of Blue Light Absorbing Filter against LED Light Exposure on Human Retinal Pigment Epithelial Cells In Vitro*, J Carcinog Mutagen S6: 008.

U.S. Pat. No. 2,397,947 by W. H. Cobert, discloses the prismatic mirror, which continues to be the primary apparatus for reducing glare reflected by a rear view mirrors into a drivers' eyes. The prismatic mirror comprises a wedged shaped glass front surface with a silver reflective backing. As the glass front surface and the silver reflective backing are not parallel, light is reflect off the front and back surfaces at different angles. The back surface reflects brightly as a silvered mirror. The front surface reflects weakly, in the same way that an un-silvered glass window against a dark background produces a weak reflection. In nighttime mode the mirror is tilted such that the light weakly reflected off the front of the glass is angled towards eye level. Conversely, in daytime mode the mirror is tilted so the light brightly reflected off the silver backing is angled towards eye level. The simplicity and low cost of this glare deflecting apparatus has contributed to its longstanding use. However, it does entail the disadvantage of requiring the driver's attention to switched it between day and night modes and it does not filter blue light.

Electrochromic automatic dimming mirrors eliminate the manual switching between modes typically required with prismatic rearview mirrors. However Electrochromic mirrors consume electric power; require wiring; and are more expensive and more vulnerable to malfunction. For example, when the electrochromic material is a liquid there is a potential for leaks.

Yellow tinted night driving glasses, such as those disclosed in Chinese patent CN 202815350, present an inexpensive apparatus for shielding a driver from glare and blue light. However, they also impose the danger that the driver's vision will be impaired in certain respects. For example, the glasses may prevent him from seeing yellow LED warning lights and traffic signals.

Therefore, there exists a need for a nonelectric, reliable, inexpensive, and safe device to shield vehicle drivers and occupants from the glare and blue light emanating from HID and LED headlights of other vehicles.

SUMMARY OF THE INVENTION

It is an object of the present invention to provide a film product and a method for reducing glare and blue light reflected from a vehicle's mirror(s) and into the eyes of the vehicle's driver and occupants.

It is another object of this invention to provide a glare reducing and blue light filtering film product which is easily adhered to a vehicle's mirror(s), and a method for doing so.

I have found that a driver can be shielded from discomfort glare from the headlights of following vehicles by adhering a film product comprised of yellow tinted translucent film to a prismatic type rear view mirror, presently equipped in most automobiles. One of the advantages of the film product is that the glare shielding benefit is realized without necessitating diversion of the driver's attention to switch between day and night modes. Rather, the prismatic type rear view mirror may remain tilted in the daytime position and still shield the driver from reflected headlight glare at night, while also providing satisfactory reflectivity during daylight hours. Another benefit is that the yellow tinting serves to filter blue light and to protect the driver's eyes from potential retinal damage from exposure to reflected blue light, which would otherwise be added to the driver's cumulative exposure to blue light. This conforms with researcher recommendations to limit eye exposure to blue light.

The film product may also be used with other types of rear view mirrors, besides prismatic type rear view mirror, as well as with side view mirrors. In its various embodiments, the film product is used with rear and side view mirrors to realize the benefit of reducing glare and filtering blue light from the headlights of following vehicles.

In one embodiment the film product comprises a single layer of yellow tinted translucent film. In another embodiment of the film product, a single layer of tinted translucent film comprises a combination of yellow and grey tinting in order to filter blue light and diminish luminosity from the headlight light reflected via the mirror surface. In another embodiment the film product comprises multiple layers of tinted translucent film, a yellow tinted layer and a grey tinted layer, in order to further reduce glare.

Still another variation of all the aforementioned embodiments is the inclusion of a tab to facilitate removing a backing and adhering the film product to a mirror.

DETAILED DESCRIPTION OF THE INVENTION

Example 1

Figure 1:
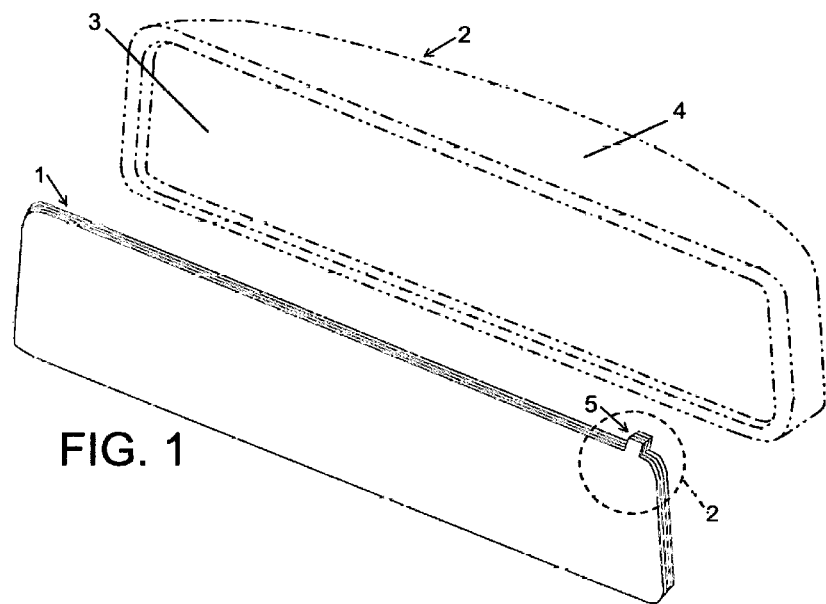
FIG. 1 shows one embodiment of the film product used with a rear view mirror where the product comprises multiple layers of translucent film, a backing and a tab.
Figure 2:
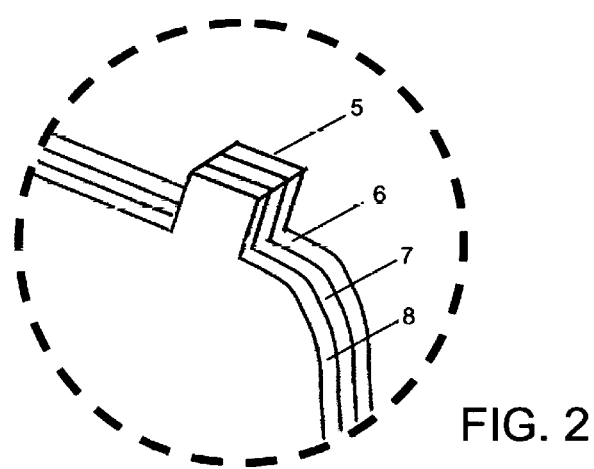
FIG. 2 shows an enlarged view of the film product shown in FIG. 1.

FIG. 1 and FIG. 2 illustrate one embodiment of the film product 1 used with an automobile rear view mirror 2. The rear view mirror 2 has a mirror surface 3 and a mirror support structure 4. The perimeter of the film product 1 has substantially the same dimensions as the perimeter of the mirror surface 3. The film product 1 has a first layer of translucent film 7, a second layer of translucent film 8, a removable backing 6 and a tab 5.

Tab 5 is integral to the translucent film layers, 7 and 8, and to the backing 6. Tab 5 facilitates removing the backing 6 and adhering the film product 1 to the mirror surface 3.

The first layer of translucent film 7 is tinted yellow (translucent 99% UV rejection) to filter blue light and to shield vehicle drivers and occupants from the glare and blue light emanating from HID and LED headlights of other vehicles. The second layer of translucent film 8 is tinted charcoal (33%-35% visible light transmitted) to further diminish luminosity from headlight light reflected via the mirror surface and thereby further reduce glare. Alternately, the first layer of translucent film 7 may be tinted grey and the second layer of translucent film 8 may be tinted yellow. The translucent film layers, 7 and 8, are adhered together with transparent glue. A means is provided to adhere the first layer of translucent film 7 to the mirror surface 3. Such means include transparent glue on the first layer of translucent film 7 or static cling.

The film product 1 is applied to the mirror surface 3 by the following steps:
 a. cleaning the mirror surface 3 of grime and dust;
 b. Spraying water on the mirror surface 3 if the static cling means is being used to adhere the first layer of translucent film 7 to the mirror surface 3;
 c. partially peeling the backing 6 off the first layer of translucent film 7 by pulling the tab 5 integral to the backing 6, thereby partially uncovering a portion of an adhering surface of the first layer of translucent film 7;
 d. aligning the film product 1 with the mirror surface 3;
 e. placing the uncovered portion of the adhering surface the first layer of translucent film 7 in contact with the mirror surface 3;
 f. pressing the uncovered portion of the adhering surface to remove any entrained air and/or water and to maximize contact between the adhering surface of the first layer of translucent film 7 and the mirror surface 3; and
 g. further peeling the backing 6 off the adhering surface of the first layer of translucent film 7 and further pressing the uncovered portion of the adhering surface until the backing 6 is completely removed and the film product 1 is completely adhered to the mirror surface 3.

Example 2

Figure 3:
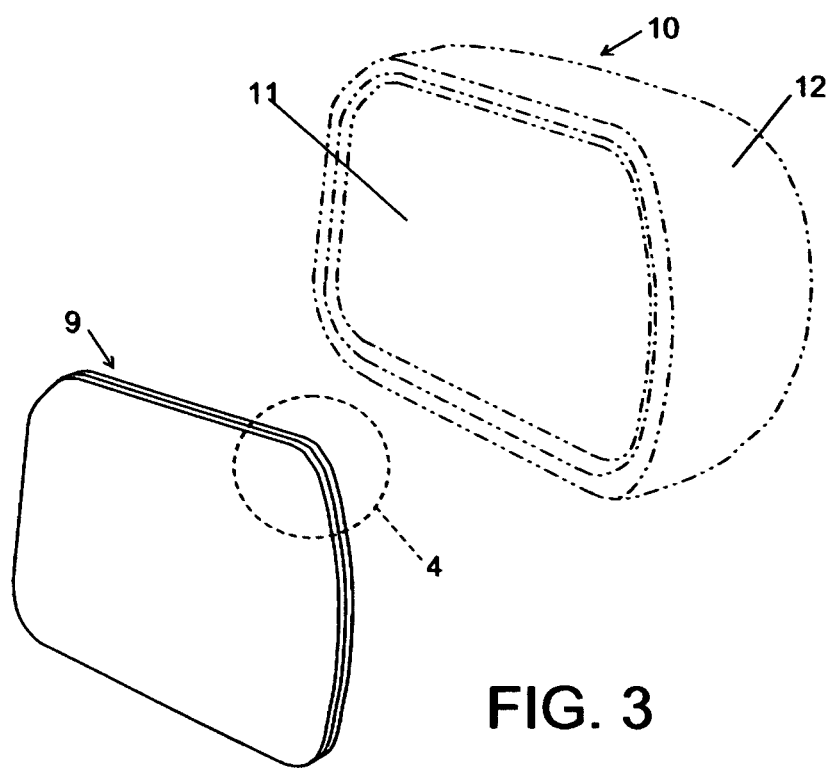
FIG. 3 shows one embodiment of the film product used with a side view mirror where the product comprises a single layer of translucent film and a backing.
Figure 4:
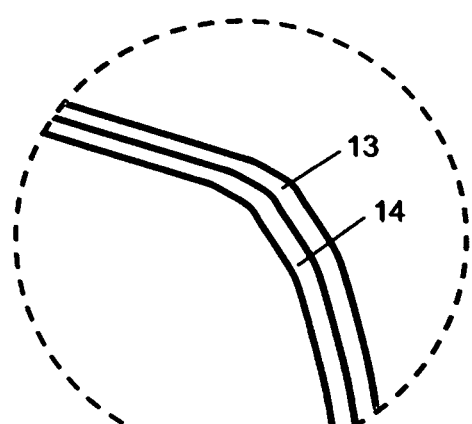
FIG. 4 shows an enlarged view of the film product shown in FIG. 3.

FIG. 3 and FIG. 4 illustrate another embodiment of the film product 9 used with an automobile side view mirror 10. The side view mirror 10 has a mirror surface 11 and a mirror support structure 12. The perimeter of the film product 9 has substantially the same dimensions as the perimeter of the mirror surface 11. The film product 9 has a single layer of translucent film 14 and a removable backing 13.

The single layer of translucent film 14 is tinted yellow to filter blue light and to thereby shield vehicle drivers and occupants from the glare and blue light emanating from HID and LED headlights of other vehicles. I have found that a 99% UV rejection/absorption yellow tinting grade for visible light adequately shields a driver from reflected headlight glare at night, while also providing satisfactory reflectivity during daylight hours.

A means is provided to adhere single layer of translucent film 14 to the mirror surface 11. Such means include transparent glue on the first layer of translucent film 7 or static cling.

The film product 9 is applied to the mirror surface 11 by the following steps:
 a. cleaning the mirror surface 11 of grime and dust;
 b. Spraying water on the mirror surface 11 if the static cling means is being used to adhere the film product 9 to the mirror surface 11;
 c. partially peeling the backing 13 off the single layer of translucent film 14 thereby partially uncovering a portion of an adhering surface of the translucent film 14;
 d. aligning the film product 9 with the mirror surface 11;
 e. placing the uncovered portion of the translucent film 14 in contact with the mirror surface 11;
 f. pressing the uncovered portion of the adhering surface to remove any entrained air and/or water and to maximize contact between the adhering surface of translucent film 14 and the mirror surface 11; and
 g. further peeling the backing 13 off the adhering surface of the translucent film 14 and further pressing the uncovered portion of the adhering surface until the backing 6 is completely removed and the translucent film 14 is completely adhered to the mirror surface 11.

I claim:

1. A film product for application to a mirror surface of an automobile comprising:
 a. at least one layer of translucent film, wherein the at least one layer of translucent film comprises:
  i. a perimeter having dimensions substantially conforming to the mirror surface; and
  ii. a substantially tinted yellow layer of translucent film, whereby blue light is filtered from headlight light reflected via the mirror surface; and
 b. a means to adhere the at least one layer of translucent film to the automobile mirror surface.

2. The film product of claim 1 that further comprises a removable backing.

3. The film product of claim 2 wherein the removable backing comprises an integral pull tab, whereby application of the film product to the mirror surface and removal of the film product from the mirror surface are facilitated.

4. The film product of claim 1 wherein the at least one layer of translucent film further comprises a tab integral to each layer of the at least one layer of translucent film, whereby application of the film product to the mirror surface and removal of the film product from the mirror surface are facilitated.

5. The film product of claim 1 wherein the at least one layer of translucent film further comprises a substantially tinted grey layer of translucent film and a means to adhere the substantially tinted grey layer of translucent film to the substantially tinted yellow layer of translucent film; whereby luminosity from headlight light reflected via the mirror surface is diminished.

6. The film product of claim 1 wherein the substantially tinted yellow layer of translucent film further comprises grey tinting, whereby yellow and grey tinting are combined within the same layer in order to filter blue light and to diminish luminosity from headlight light reflected via the mirror surface.

7. The film product of claim 1 wherein the mirror surface is the surface of a rearview or side view mirror.

8. A film product for application to a mirror surface of an automobile, comprising:

a. at least one layer of translucent film, wherein the at least one layer of translucent film comprises:
   i. a perimeter having dimensions substantially conforming to the mirror surface; and
   ii. a substantially tinted yellow layer of translucent film, whereby blue light is filtered from headlight light reflected via the mirror surface;
b. a removable backing;
c. a means to adhere the at least one layer of translucent film to the automobile mirror surface;
d. a tab integral to the backing and to each layer of the at least one layer of translucent film; and wherein the mirror surface is the surface of a rearview or side view mirror; whereby blue light is filtered and glare is diminished from headlight light reflected via the mirror surface.

* * * * *